United States Patent
Tomoda et al.

(10) Patent No.: US 6,915,784 B2
(45) Date of Patent: Jul. 12, 2005

(54) SYSTEM AND METHOD FOR CONTROLLING SPARK-IGNITION INTERNAL COMBUSTION ENGINE

(75) Inventors: Terutoshi Tomoda, Mishima (JP); Hiroshi Nomura, Gotenba (JP); Nobuyuki Shimizu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/931,994

(22) Filed: Sep. 2, 2004

(65) Prior Publication Data

US 2005/0051135 A1 Mar. 10, 2005

(30) Foreign Application Priority Data

Sep. 9, 2003 (JP) .......................................... 2003-317149

(51) Int. Cl.[7] .................................................. F02B 7/00
(52) U.S. Cl. ....................................... 123/431; 123/436
(58) Field of Search ................................. 123/431, 436, 123/399

(56) References Cited

U.S. PATENT DOCUMENTS

| | | | |
|---|---|---|---|
| 6,499,463 B1 * | 12/2002 | Berriman et al. ........... | 123/431 |
| 6,684,852 B2 * | 2/2004 | Wright et al. ............... | 123/431 |
| 2002/0007816 A1 * | 1/2002 | Zur Loye et al. ........... | 123/295 |
| 2002/0020388 A1 * | 2/2002 | Wright et al. ............... | 123/304 |
| 2002/0040692 A1 * | 4/2002 | LaPointe et al. ........ | 123/27 GE |
| 2003/0015176 A1 * | 1/2003 | Berriman et al. ........... | 123/431 |

FOREIGN PATENT DOCUMENTS

| JP | 2001-020837 A | 1/2001 |
|---|---|---|
| JP | 2002-364409 A | 12/2002 |

* cited by examiner

*Primary Examiner*—John T. Kwon
(74) *Attorney, Agent, or Firm*—Oliff & Berridge, PLC

(57) ABSTRACT

A control system controls a spark-ignition internal combustion engine. The spark-ignition internal combustion engine includes a cylinder, and a fuel injection valve arranged in the cylinder; and an intake port that communicates with the cylinder, and a fuel injection valve arranged in the intake port. Fuel is injected from both the fuel injection valves in at least a part of an operating range. If combustion fluctuations exceed a predetermined amount, in consideration of a preset proportion of fuels to be injected into the cylinder and the intake port, a proportion of fuel to be injected into the cylinder is decreased and a proportion of fuel to be injected into the intake port is increased.

12 Claims, 1 Drawing Sheet

SYSTEM AND METHOD FOR CONTROLLING SPARK-IGNITION INTERNAL COMBUSTION ENGINE

BACKGROUND OF THE INVENTION

1) Field of the Invention

The present invention relates to a system and a method for controlling a spark-ignition internal combustion engine to have lesser combustion fluctuations.

2) Description of the Related Art

A conventional technology for controlling spark-ignition internal combustion engines is disclosed in Japanese Patent Application Laid Open No. 2001-20837. The disclosed spark-ignition internal combustion engine includes fuel injection valves arranged in both a cylinder and an intake port. Such a structure is adopted to maintain both stratified charge combustion and homogeneous combustion in their satisfactory states. The disclosed control system changes the proportion between direct injection and intake-port injection based on an operating state of the internal combustion engine.

However, in the conventional technology, amount of injected fuel may fluctuate or combustion fluctuations may occur. The amount of fuel can fluctuate due to changes in the injection characteristics. The injection characteristics change due to deposition of material in a direct injection valve or changes in amount of heat received from combustion gas. On the other hand, the combustion fluctuations may occur because combustion deteriorates when mixture is made insufficiently homogeneous caused by a shortage of time to vaporize the fuel injected.

SUMMARY OF THE INVENTION

It is an object of the present invention to solve at least the problems in the conventional technology.

A control system according to an aspect of the present invention controls a spark-ignition internal combustion engine. The spark-ignition internal combustion engine includes a cylinder, and a fuel injection valve arranged in the cylinder; and an intake port that communicates with the cylinder, and a fuel injection valve arranged in the intake port. Fuel is injected from both the fuel injection valves in at least a part of an operating range. If combustion fluctuations exceed a predetermined amount, in consideration of a preset proportion of fuels to be injected into the cylinder and the intake port, a proportion of fuel to be injected into the cylinder is decreased and a proportion of fuel to be injected into the intake port is increased.

The intake port further includes a throttle valve, and the opening of the throttle valve is reduced under a lean operating condition.

The opening of a valve for adjusting a flow rate of recirculated gas is reduced under a homogeneous operating condition in which an exhaust gas recirculator is also provided.

The intake port further includes a throttle valve, and the opening of the throttle valve is reduced under the homogeneous operating condition.

A control system according to another aspect of the present invention controls a spark-ignition internal combustion engine. The spark-ignition internal combustion engine includes a cylinder, and a cylinder injection valve arranged in the cylinder; and an intake port that communicates with the cylinder, and an intake-port injection valve arranged in the intake port. Fuel is injected from both the cylinder injection valve and the intake-port injection valve in at least a part of an operating range. If a combustion fluctuation value exceed a predetermined permissible amount, a total amount of fuels injected into the intake port from the intake-port injection valve and the cylinder from the cylinder injection valve is set constant, amount of fuel to be injected into the cylinder from the cylinder injection valve is increased by a predetermined value, and amount of fuel to be injected into the intake port from the intake-port injection valve is increase by the predetermined value.

The control system includes an electronic control unit, and the predetermined permissible amount is previously defined as a map according to an engine speed and load and stored in the electronic control unit.

The control system includes an electronic control unit, and an optimum value for the predetermined value is previously defined by a map and stored in the electronic control unit.

The predetermined value is changed according to operating conditions of the spark-ignition internal combustion engine, the operating conditions include number of revolutions and amount of load.

Control is performed by multiplying the injection variation used to calculate the amount of fuel to be injected into the intake port by a predetermined relevance value, the predetermined relevance value being previously calculated from number of revolutions and load so as to be equal torque.

The control system includes a pressure sensor that detects pressure in the cylinder. The pressure detected is used to calculate the combustion fluctuation value.

The control system includes a crank sensor that detects engine speed. The engine speed detected is used to calculate the combustion fluctuation value.

A method according to still another aspect of the present invention controls a spark-ignition internal combustion engine. The spark-ignition internal combustion engine includes a cylinder, and a fuel injection valve arranged in the cylinder; and an intake port that communicates with the cylinder, and a fuel injection valve arranged in the intake port. Fuel is injected from both the fuel injection valves in at least a part of an operating range. The method includes, if combustion fluctuations exceed a predetermined amount, in consideration of a preset proportion of fuels to be injected into the cylinder and the intake port, decreasing a proportion of fuel to be injected into the cylinder and increasing a proportion of fuel to be injected into the intake port.

The other objects, features, and advantages of the present invention are specifically set forth in or will become apparent from the following detailed description of the invention when read in conjunction with the accompanying drawings.

DETAILED DESCRIPTION

Exemplary embodiments of a system and a method, for controlling a spark-ignition internal combustion engine, according to the present invention are explained in detail below with reference to the accompanying drawings. It is noted that the present invention is not limited by these embodiments.

Figure 1:
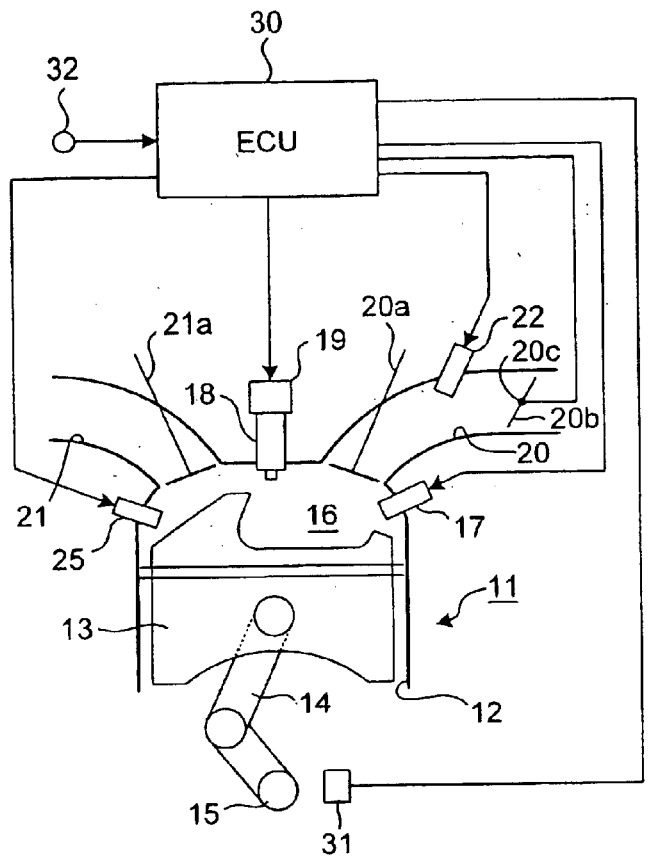
FIG. 1 is a schematic diagram of a control system for a spark-ignition internal combustion engine according to a first embodiment of the present invention.

FIG. 1 is a schematic diagram of a control system according to a first embodiment of the present invention. It is assumed here for the sake of explanation that the control system is used to control a four-cycle direct-injection type internal combustion engine 11. The internal combustion engine 11 includes a cylinder 12 and a piston 13 in the cylinder 12. The piston 13 is connected, through a connecting rod 14, to a crankshaft 15. The crankshaft 15 is an output shaft of the internal combustion engine 11. The connecting rod 14 translates reciprocating motion of the piston 13 into rotating motion of the crankshaft 15.

The internal combustion engine 11 includes a combustion chamber 16. A direct injection valve (fuel injection valve) 17 opens into the combustion chamber 16. Fuel at a predetermined pressure is injected into the cylinder 12 through the direct injection valve 17. An ignition plug 18 generates a spark to ignite the mixture in the combustion chamber 16. An igniter 19 controls timing of generation of sparks by the ignition plug 18.

Top surface of the piston 13 is formed in a special shape suitable for forming layers of mixture from the fuel injected from the direct injection valve 17 and for transporting the mixture to near the ignition plug 18 at the ignition timing.

An intake port 20 and an exhaust port 21 open in the combustion chamber 16 through an intake valve 20a and an exhaust valve 21a, respectively. An intake-port injection valve (fuel injection valve) 22 for injecting fuel into the intake port 20 opens in the intake port 20. A throttle valve 20b controls an amount of air that is taken into the intake port 20 depending on operation of an accelerator pedal (not shown).

Structural elements that detect operating states of the internal combustion engine 11 will be explained in detail now. A crank sensor 31 detects a crank angle of the crankshaft 15 and an engine speed. An accelerator sensor 32 detects an amount of depression of the accelerator pedal. A throttle opening sensor 20c detects degree of opening of the throttle valve 20b. A cylinder pressure sensor 25 detects cylinder pressure, i.e., a combustion fluctuation value.

The control system further includes an exhaust gas recirculator (EGR device) (not shown), an EGR valve opening sensor (not shown) that detects the opening of the EGR valve for adjusting the flow rate of recirculated gas.

An electronic control unit (ECU) 30 receives detection signals from the crank sensor 31, the accelerator sensor 32, the throttle opening sensor 20c, the cylinder pressure sensor 25, and the EGR valve opening sensor. The ECU 30 then determines operating conditions of the internal combustion engine 11 and controls the intake valve 20a, the exhaust valve 21a, the direct injection valve 17, the intake-port injection valve 22, and the ignition plug 18.

The ECU 30 switches a combustion system between the stratified charge combustion and the homogeneous combustion according to the operating condition of the internal combustion engine 11. For example, if the internal combustion engine 11 is operated in a high-speed high-load region, the homogeneous combustion is employed, and if it is operated in a low-speed low-load region, the stratified charge combustion is employed. The combustion system is switched in the above manner due to following reasons. This is, when high output is required during the high-speed high-load operation, an air/fuel ratio of mixture is set to a rich value to improve engine output, and when the high output is not required so much during the low-speed low-load operation, the air/fuel ratio is set to a lean value to improve fuel consumption.

During the stratified charge combustion, the ECU 30 opens the direct injection valve 17 and so that fuel is injected into the combustion chamber 16 during a compression stroke. Mixture is formed in the combustion chamber 16 by the fuel injection. The air/fuel ratio of the mixture is set to a leaner value than the air/fuel ratio during operation of the homogeneous combustion. The fuel injected is collected around the ignition plug 18, and therefore, it can be ignited even if an average air/fuel ratio of the whole mixture is on the lean side.

On the other hand, during the homogeneous combustion, the ECU 30 opens basically the intake-port injection valve 22 and causes fuel to be injected into the intake port 20 during an intake stroke. Mixture is formed in the combustion chamber 16 based on the fuel injection. The air/fuel ratio of the mixture is set to a theoretical air/fuel ratio or a leaner value than the theoretical air/fuel ratio. Furthermore, during the operation of the homogeneous combustion, in the control system, the ECU 30 opens the direct injection valve 17 in addition to opening the intake-port injection valve 22 and causes the fuel to be injected into the combustion chamber 16, which makes the direct injection valve 17 cooled.

How the fuel injection control is performed will be explained below with reference to FIG. 2. The purpose of the fuel injection control is as follows. In an operating mode in which the direct injection valve 17 is used, if combustion fluctuations (torque fluctuations) of the internal combustion engine 11 exceed a specified value, the proportion of the direct injection by the direct injection valve 17 in all the injection amount is gradually reduced, and the reduction in the amount is compensated for with the intake-port injection by the intake-port injection valve 22. The combustion fluctuations (torque fluctuations) are thereby reduced to the specified value or less.

Figure 2:
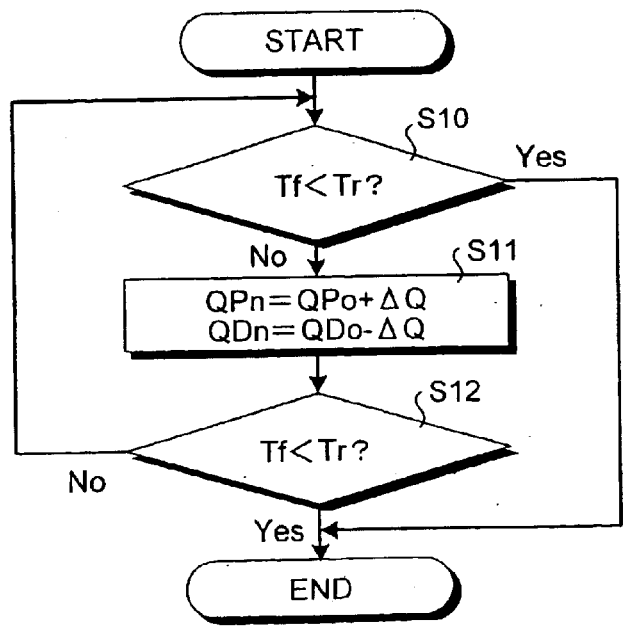
FIG. 2 is a flowchart of fuel injection control.

In other words, as shown in FIG. 2, it is determined whether the real combustion fluctuation Tf, which is calculated by the ECU 30 based on cylinder pressure detected by the cylinder pressure sensor 25, is smaller than a permissible combustion fluctuation Tr (step S10). If the result of the determination is "Yes", the control is terminated. The permissible combustion fluctuation Tr can be determined beforehand and stored in the ECU 30. The permissible combustion fluctuation Tr can be determined from a map that is prepared based on engine speed or load and can be stored in the ECU 30.

On the other hand, if the result of the determination is "No", at step S11, a total injection amount Qall (=QP+QD) is set to constant. Specifically, the total injection amount Qall is a sum of an intake-port injection amount QP by the intake-port injection valve 22 and a direct injection amount QD by the direct injection valve 17. Based on this, the direct injection amount QD is decreased (QDn=QDo−ΔQ) by a predetermined injection variation ΔQ, and at the same time, the intake-port injection amount QP is increased (QPn=QPo+ΔQ) by the injection variation ΔQ. Where "n" and "o", subscripts of P and D, indicate "new" and "old", respectively.

An optimum value for the injection variation ΔQ can be previously defined according to the map or the like and stored in the ECU 30. Furthermore, the injection variation ΔQ to be used may be changed according to operating conditions (e.g., the number of revolutions and load) of the internal combustion engine 11.

In order to suppress fluctuations in the torque so as to obtain equal torque, the injection variation ΔQ in the computational equation (QPn=QPo+ΔQ) for the intake-port injection amount QP is multiplied by a predetermined relevance value (which is calculated from the number of revolutions and the load so as to be equal torque) to obtain a value. This value can be used to control the torque fluctuations.

The control is continued until Tf is smaller than Tr (step S12). It is noted that the control can be performed in various types of operating modes in each of which the direct injection valve 17 is used.

As explained above, in the control system for the spark-ignition internal combustion engine according to the first embodiment, when the combustion fluctuations in the internal combustion engine 11 have exceeded the predetermined amount, the proportion of the fuel injection from the intake-port injection valve 22 is increased. This is because, since the intake-port injection valve 22 less affects the change in the injection characteristics, it is easier to obtain a homogeneous mixture. It is thereby possible to homogeneous the mixture and minimize the combustion fluctuations.

In the first embodiment, the combustion fluctuation value Tf is calculated based on cylinder pressure detected by the cylinder pressure sensor 25. However, the combustion fluctuation value Tf may be calculated using some other method. For example, the crank sensor 31 may be used to detect fluctuations in the engine speed, and the combustion fluctuation value Tf may be calculated based on the fluctuations, so that the cylinder pressure sensor 25 becomes redundant.

A second embodiment of the present invention relates to controlling the opening of the throttle valve 20b. This control may be performed in addition to the control in the first embodiment. The opening of the throttle valve 20b is narrowed when the internal combustion engine 11 is under the lean operating conditions. In other words, by setting an air/fuel mixture ratio A/F to be a rich side, flame propagation becomes better, which allows minimization of combustion fluctuations.

A third embodiment of the present invention relates to maintaining an air/fuel mixture ratio A/F at a stoichiometric air/fuel ratio and reduce the opening of the EGR valve (not shown) for adjusting the flow rate of recirculated gas. This control may be performed in addition to the control in the first embodiment. This control is performed when the internal combustion engine 11 is under the homogeneous operating conditions in which the exhaust gas recirculator (EGR device) is also used. In other words, reduction in the amount of recirculated gas (the amount of EGR gas) allows minimization of combustion fluctuations.

According to the control system of the present invention, when the combustion fluctuations in a internal combustion engine exceed a predetermined permissible amount, more fuel is injected from the intake-port injection valve. Because the intake-port injection valve less affects the change in the injection characteristics it is easier to homogeneous mixture by. It is thereby possible to homogeneous the mixture and minimize the combustion fluctuations.

Furthermore, by setting the air/fuel mixture ratio A/F to the rich side, the flame propagation becomes better, and the combustion fluctuations can be minimized.

Moreover, by reducing the amount of recirculated gas (the amount of EGR gas), the combustion fluctuations can be minimized.

Furthermore, the amount of recirculated gas (the amount of EGR gas) is reduced. Also, by setting the air/fuel mixture ratio A/F to the rich side, the flame propagation becomes better, and the combustion fluctuations can be minimized.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A control system for controlling a spark-ignition internal combustion engine, wherein the spark-ignition internal combustion engine includes
   a cylinder, and a fuel injection valve arranged in the cylinder; and
   an intake port that communicates with the cylinder, and a fuel injection valve arranged in the intake port,
   wherein fuel is injected from both the fuel injection valves in at least a part of an operating range, wherein
   if combustion fluctuations exceed a predetermined amount, in consideration of a preset proportion of fuels to be injected into the cylinder and the intake port, a proportion of fuel to be injected into the cylinder is decreased and a proportion of fuel to be injected into the intake port is increased.

2. The control system according to claim 1, wherein the intake port further includes a throttle valve, and the opening of the throttle valve is reduced under a lean operating condition.

3. The control system according to claim 1, wherein the opening of a valve for adjusting a flow rate of recirculated gas is reduced under a homogeneous operating condition in which an exhaust gas recirculator is also provided.

4. The control system according to claim 3, wherein the intake port further includes a throttle valve, and the opening of the throttle valve is reduced under the homogeneous operating condition.

5. A control system for controlling a spark-ignition internal combustion engine, wherein the spark-ignition internal combustion engine includes
   a cylinder, and a cylinder injection valve arranged in the cylinder; and
   an intake port that communicates with the cylinder, and an intake-port injection valve arranged in the intake port,
   wherein fuel is injected from both the cylinder injection valve and the intake-port injection valve in at least a part of an operating range, wherein
   if a combustion fluctuation value exceed a predetermined permissible amount,
   a total amount of fuels injected into the intake port from the intake-port injection valve and that injected into the cylinder from the cylinder injection valve is set constant,
   amount of fuel to be injected into the cylinder from the cylinder injection valve is increased by a predetermined value, and
   amount of fuel to be injected into the intake port from the intake-port injection valve is increase by the predetermined value.

6. The control system according to claim 5, comprising an electronic control unit,
   wherein the predetermined permissible amount is previously defined as a map according to an engine speed and load, and the predetermined permissible amount is stored in the electronic control unit.

7. The control system according to claim 5, comprising an electronic control unit,
   wherein an optimum value for the predetermined value is previously defined by a map, and the optimum value is previously stored in the electronic control unit.

8. The control system according to claim 5, wherein the predetermined value is changed according to operating conditions of the spark-ignition internal combustion engine, the operating conditions include number of revolutions and amount of load.

9. The control system according to claim 5, wherein control is performed by multiplying the injection variation used to calculate the amount of fuel to be injected into the intake port by a predetermined relevance value, the predetermined relevance value being previously calculated from number of revolutions and load so as to be equal torque.

10. The control system according to claim 5, further comprising:
a pressure sensor that detects pressure in the cylinder, wherein the pressure detected is used to calculate the combustion fluctuation value.

11. The control system according to claim 5, further comprising:
a crank sensor that detects engine speed, wherein the engine speed detected is used to calculate the combustion fluctuation value.

12. A method for controlling a spark-ignition internal combustion engine, wherein the spark-ignition internal combustion engine includes a cylinder, and a fuel injection valve arranged in the cylinder; and an intake port that communicates with the cylinder, and a fuel injection valve arranged in the intake port, wherein fuel is injected from both the fuel injection valves in at least a part of an operating range, the method comprising:

if combustion fluctuations exceed a predetermined amount, in consideration of a preset proportion of fuels to be injected into the cylinder and the intake port, decreasing a proportion of fuel to be injected into the cylinder and increasing a proportion of fuel to be injected into the intake port.

* * * * *